(12) United States Patent
Okawa et al.

(10) Patent No.: US 8,142,837 B2
(45) Date of Patent: Mar. 27, 2012

(54) METHOD AND APPARATUS FOR APPLYING ELECTRODE MIXTURE PASTE

(75) Inventors: Takashi Okawa, Kanagawa (JP); Toru Okamoto, Kanagawa (JP); Tomoki Ikeda, Kanagawa (JP); Masao Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 11/920,045

(22) PCT Filed: Apr. 26, 2006

(86) PCT No.: PCT/JP2006/308741
§ 371 (c)(1),
(2), (4) Date: Apr. 30, 2008

(87) PCT Pub. No.: WO2006/120906
PCT Pub. Date: Nov. 16, 2006

(65) Prior Publication Data
US 2009/0098277 A1    Apr. 16, 2009

(30) Foreign Application Priority Data
May 9, 2005    (JP) .................................. 2005-135545

(51) Int. Cl.
*B05C 11/10* (2006.01)
(52) U.S. Cl. ........... 427/58; 427/115; 118/672; 118/673
(58) Field of Classification Search .................. 118/124, 118/672, 673; 427/58, 115, 8, 9, 10; 242/366.2, 242/533.7
See application file for complete search history.

(56) References Cited

U.S. PATENT DOCUMENTS
4,860,964 A    8/1989    Ishii et al.

FOREIGN PATENT DOCUMENTS

| JP | 57-062140 | 4/1982 |
|---|---|---|
| JP | 62-088265 | 4/1987 |
| JP | 02-144360 | 6/1990 |
| JP | 09-063565 | 3/1997 |
| JP | 2000-228188 | 8/2000 |
| JP | 2001-149840 | 6/2001 |
| JP | 2001-176066 | 6/2001 |
| JP | 2002-224882 | 8/2002 |

OTHER PUBLICATIONS

Extended European Search Report issued in European Patent Application No. 06745719.2-2119, dated Jan. 27, 2011.

*Primary Examiner* — George Koch
(74) *Attorney, Agent, or Firm* — McDermott Will & Emery LLP

(57) ABSTRACT

An electrode mixture paste application method includes: a first step of unwinding a core material (2) wound in a coil shape; a second step of applying an electrode mixture paste (5) to both sides of the core material; a third step of adjusting an application amount of the electrode mixture paste; a fourth step of drying a paste-coated sheet with the electrode mixture paste applied to the both sides thereof; and a fifth step of winding the paste-coated sheet (6) in a coil shape, wherein, in the fifth step, the paste-coated sheet is wound such that each of widthwise edge portions of a mixture-formed portion (9) is prevented from sequentially overlapping itself. This can achieve a stable method for applying an electrode mixture paste in which the deformation of an electrode caused by a dog-bone shape generated at both edge portions of a mixture-formed portion can be avoided.

4 Claims, 2 Drawing Sheets

ND APPARATUS FOR APPLYING
METHOD AND APPARATUS FOR APPLYING ELECTRODE MIXTURE PASTE

RELATED APPLICATIONS

This application is the U.S. National Phase under 35 U.S.C. §371 of International Application No. PCT/JP2006/308741, filed on Apr. 26, 2006, which in turn claims the benefit of Japanese Application No. 2005-135545, filed on May 9, 2005, the disclosures of which Applications are incorporated by reference herein.

TECHNICAL FIELD

The present invention relates to a method and an apparatus for applying an electrode mixture paste to a core material made of porous metal thin plate to obtain a paste-coated sheet. In particular, the invention relates to a method for avoiding the deformation of an electrode.

BACKGROUND ART

Batteries such as alkaline storage batteries and lithium ion secondary batteries are widely used as the power source for portable devices, machine tools, or electric vehicles. Of these, nickel metal-hydride storage batteries have a relatively high energy density and excellent durability, and the applications thereof, including as power sources for electric vehicles, are being expanded.

Generally, the main components of nickel metal-hydride storage batteries include: a positive electrode formed by filling a three-dimensional metal porous material with nickel hydroxide and other materials; and a negative electrode formed by applying an electrode mixture paste composed of a hydrogen-absorption alloy and other materials to porous metal thin plate (hereinafter simply abbreviated as a "core material") such as a punched metal. Of these two, the negative electrode can be produced continuously because of the nature of its production process, which has received attention as a highly efficient process. Specifically, a method has been proposed in which, after the core material is immersed in the electrode mixture paste, the application amount of the electrode mixture paste is adjusted to produce a paste-coated sheet.

The produced paste-coated sheet is wound in a coil shape in order to convey to the next step (such as a rolling step). In order to stabilize the operation of the next step, the winding accuracy of the paste-coated sheet must be improved. As concrete measures, a method has been proposed in which the position of an edge portion in the width direction of a travelling paste-coated sheet is detected, and is remedied when the detected position is displaced (see, for example, Patent Document 1).

[Patent Document 1] Japanese Patent Laid-Open Publication No. 2000-228188

DISCLOSURE OF THE INVENTION

Problems to be Solved by the Invention

Generally, both edge portions in the width direction of a paste-coated sheet are often rubbed with a resin-made chip or the like in order to allow the paste-coated sheet to smoothly travel during an application-drying step. In such a case, an electrode mixture paste introduced directly below the chip due to the travelling of a core material collides with the chip, whereby a larger amount is supplied to both edge portions in the width direction of a mixture-formed portion. Accordingly, a state in which the application thickness in such a portion is larger than that in the other portions (hereinafter referred to as "dog-bone" phenomenon) is formed. When a remarkable dog-bone shape is formed, edge portions in the width direction of the mixture-formed portion overlap each other when the paste-coated sheet is wound in the final stage, whereby the paste-coated sheet itself is deformed. This deformation is not eliminated even after electrodes are formed through rolling. When such electrodes are laid over one another by stacking or winding, it is difficult to contain the electrodes in a battery case. Such a trouble frequently occurs particularly in a negative electrode mixture paste for a nickel metal-hydride storage battery. In this instance, the negative electrode mixture paste is produced so as to have a viscosity of 50 to 300 poises (as measurement results using a B-type viscometer) in view of its storage stability.

The present invention has been made in view of the foregoing problems. Accordingly, it is an object of the invention to provide a stable method for applying an electrode mixture paste in which the deformation of an electrode caused by a dog-bone shape generated at both edge portions of a mixture-formed portion can be avoided.

Means for Solving the Problems

To achieve the above object, the present invention provides a method for applying an electrode mixture paste, including: a first step of unwinding a core material wound in a coil shape; a second step of applying the electrode mixture paste to both sides of the core material; a third step of adjusting an application amount of the electrode mixture paste; a fourth step of drying a paste-coated sheet with the electrode mixture paste applied to the both sides thereof; and a fifth step of winding the paste-coated sheet in a coil shape, wherein, in the fifth step, the paste-coated sheet is wound such that each of widthwise edge portions of a mixture-formed portion is prevented from sequentially overlapping itself.

As means for realizing the above-described application method, the present invention provides an apparatus for applying an electrode mixture paste. The apparatus includes: an uncoiler unit for unwinding a core material wound in a coil shape; an immersion unit for immersing the core material in an electrode mixture paste; an application amount adjusting unit for adjusting an application amount of the electrode mixture paste; a drying unit; and a coiler unit for winding a paste-coated sheet, after applying and drying, in a coil shape, wherein the coiler unit includes a mechanism for winding the paste-coated sheet such that each of widthwise edge portions of a mixture-formed portion is prevented from sequentially overlapping itself.

By using the technique of the present invention, a paste-coated sheet can be wound such that each of widthwise edge portions of a mixture-formed portion, which each have large application thickness, is prevented from sequentially overlapping itself even when a dog-bone shape is formed during the application of a high viscosity paste such as a negative electrode mixture paste for nickel metal-hydride storage batteries. Therefore, the deformation of an electrode caused by the dog-bone shape can be avoided.

BEST MODE FOR CARRYING OUT THE INVENTION

Hereinbelow, the best mode for carrying out the invention will be described in detail with reference to the drawings.

Figure 1:
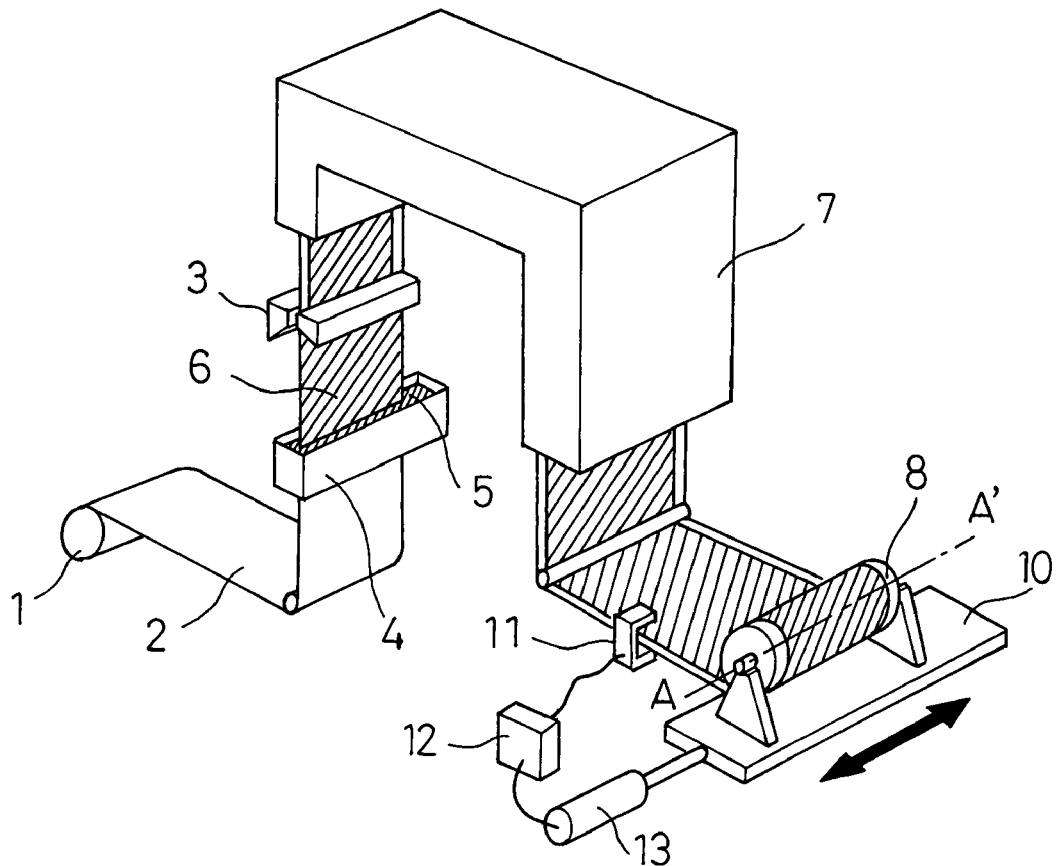
FIG. 1 is a schematic view of an electrode mixture paste application apparatus of the present invention.

FIG. 1 is a schematic view of an apparatus for applying electrode mixture paste in accordance with the present invention. A coil-shaped core material 2 made of porous metal thin plate is unwound by an uncoiler unit 1. Subsequently, the core material 2 is introduced into an immersion unit 4 filled with an electrode mixture paste 5, and the electrode mixture paste 5 is applied to the core material 2. Next, the core material 2 passes through an application amount adjusting unit 3 to form a paste-coated sheet 6. Then, the paste-coated sheet 6 is introduced into a drying unit 7 and thereafter is wound in a coil shape on a coiler unit 8. The coiler unit 8 is placed on a movable base 10, and the base 10 can be reciprocally moved in the width direction of the paste-coated sheet 6 in an interlocked manner with the winding operation of the coiler unit 8.

Figure 2:
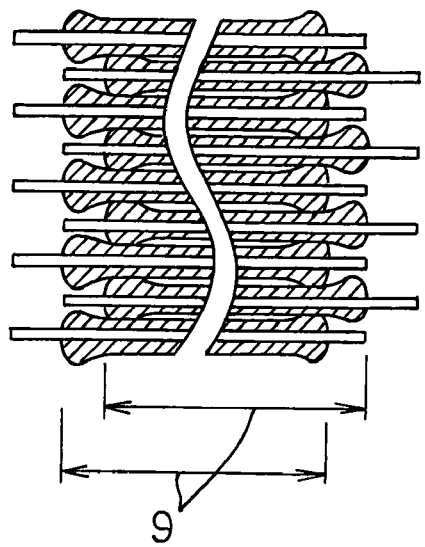
FIG. 2 is a schematic view of an enlarged partial cross-section of a paste-coated sheet wound in a coil shape using the electrode mixture paste application apparatus of the present invention.
Figure 3:
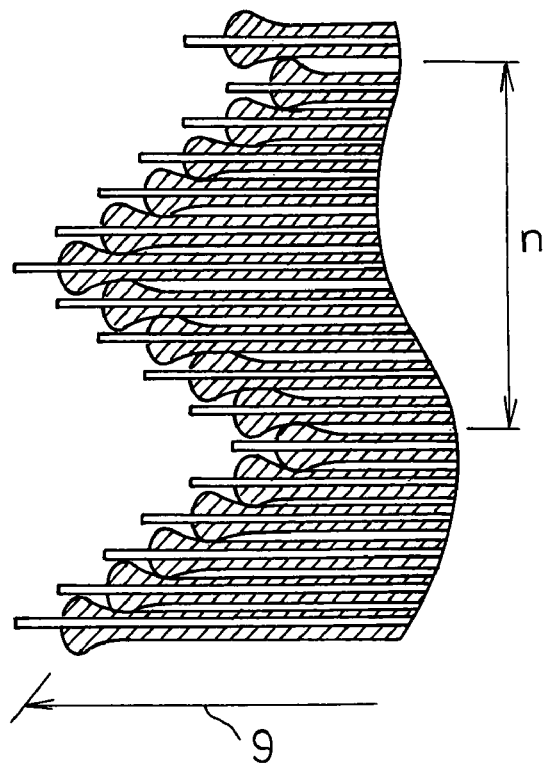
FIG. 3 is a schematic view of an enlarged partial cross-section of a paste-coated sheet wound in a coil shape by means of another method using the electrode mixture paste application apparatus of the present invention.

FIGS. 2 and 3 are each an enlarged schematic view of a partial A-A cross-section of the paste-coated sheet 6 wound on the coiler unit 8 in this apparatus. Both edge portions in the width direction of a mixture-formed portion 9 are formed into a dog-bone shape in which the application thickness thereof is larger than that of the other portions. As shown in FIG. 1, in the present invention, the base 10 having the coiler unit 8 placed thereon is reciprocally moved in the width direction of the paste-coated sheet 6 in an interlocked manner with the winding operation of the coiler unit 8. Therefore, the mixture-formed portion 9 is wound such that each of the widthwise edge portions thereof is prevented from sequentially overlapping itself. In such a wound shape, sequential overlapping of large application thickness portions shown in a conventional example of FIG. 4 can be prevented. Hence, a suitable wound shape of the paste-coated sheet 6 is obtained, and eventually the deformation of an electrode can be avoided.

As concrete measures for obtaining a coil of the above paste-coated sheet 6, there must be provided in the coiler unit 8 and close proximity thereof: a detection unit 11 for detecting a predetermined portion of the paste-coated sheet 6; a driving unit 13 for reciprocally moving the base 10 provided on a guide rail (not shown); and a control unit 12 for controlling the mixture-formed portion 9 such that each of the widthwise edge portions thereof is prevented from sequentially overlapping itself. More specifically, a method may be used in which, while an edge portion of the core material 2 and the boundary between the mixture-formed portion 9 (black) and the core material 2 (silver) are detected by the detection unit 11 and a phase difference (the distance moved by the driving unit 13) is controlled by the control unit 12, the base 10 is moved in right and left directions with substantially the same phase difference by the driving unit 13.

Let n be the number of turns until the mixture-formed portion 9 returns to substantially the same position in the width direction. Then, it is desirable that $10 \leq n \leq 30$. FIG. 2 shows a case in which, when a motion in right and left directions is repeated for each turn, two turns in total (n=2) are required until a position substantially the same as the initial position is recovered. FIG. 3 shows a case in which ten turns in total (n=10) are required until a position substantially the same as the initial position is recovered, i.e., a leftward motion is performed for each of five turns and thereafter a rightward motion is performed for each of further five turns. In both the cases, the same effect of avoiding the deformation of an electrode is obtained. However, when the moving direction is frequently switched in right and left directions in a repeated manner as shown in FIG. 2, wrinkles are likely to be formed in the paste-coated sheet 6. In contrast, when the frequency of switching of the moving direction is reduced and the moving distance is increased as in the case of n>30, the paste-coated sheet 6 wound on the coiler unit 8 is likely to lean to one side and to be stretched.

Hereinbelow, an Example of the present invention will be described using a negative electrode (a hydrogen-absorption alloy electrode) for a nickel metal-hydride storage battery. Of course, the present invention is not limited to the Example, so long as the core material is porous metal thin plate. The invention can also be applied to a sintered substrate which is a precursor of a sintered nickel positive electrode for an alkaline storage battery and to positive and negative electrodes for a lithium polymer battery in which a metal lath is used as the porous metal thin plate.

Example 1

A hydrogen-absorption alloy represented by a chemical formula of $MmNi_{3.55}Co_{0.75}Mn_{0.4}Al_{0.3}$ was pulverized into particles, having an average diameter of 30 μm, in water using a wet ball-mill, thereby obtaining the hydrogen-absorption alloy powder. The alloy powder was immersed in an alkali aqueous solution for surface treatment. Subsequently, 10 kg of an aqueous solution of carboxymethyl cellulose (solid content ratio: 1.5%) and 0.4 kg of Ketjen black were added to 100 kg of the hydrogen-absorption alloy powder, and the mixture was kneaded. Furthermore, 1.75 kg of an aqueous solution of styrene-butadiene copolymer rubber particles (solid content ratio: 40%) was added thereto, and the resultant mixture was stirred, thereby producing an electrode mixture paste 5.

This electrode mixture paste 5 was applied at a rate of 5 m/min to both sides of the core material 2 (the overall length of one coil: 200 m) and dried, while the electrode mixture paste 5 was shaved off from an area within 20 mm from each of the edges so as to obtain an applied width of 260 mm and an overall thickness after application of 260 μm, thereby producing a paste-coated sheet 6. In this instance, the core material 2 was made of an iron-made punched metal plated with nickel and having a thickness of 60 μm, a width of 300 mm, a punched hole diameter of 1 mm, and a pore rate of 42%.

The paste-coated sheet 6 was wound on the coiler unit 8 such that ten turns (n=10) were made until the widthwise edge portion of the mixture-formed portion 9 was returned to a position substantially the same as the initial position, as shown in FIG. 3. Specifically, the detection unit 11 was provided in close proximity to the coiler unit 8, and the boundary between the mixture-formed portion 9 and the core material 2 was detected by the detection unit 11. Then, while the overall meandering motion of the paste-coated sheet 6 was corrected, the paste-coated sheet 6 was wound while the base 10 was reciprocally moved using the driving unit 13 based on signals from the control unit 12 such that the following operation was repeated: winding the paste-coated sheet 6 five turns while moving it 2 mm to the left for each turn; and thereafter winding the paste-coated sheet 6 five turns while moving it 2 mm to the right for each turn.

A five meter length of the wound paste-coated sheet 6 was unwound, and the deformation of the paste-coated sheet 6 at a 195 m point after application was observed in terms of the deflection height. It was found that the maximum value of the deflection was only 0.04 mm at the widthwise edge of the mixture-formed portion 9.

Example 2

In contrast to Example 1, the paste-coated sheet 6 was wound on the coiler unit 8 such that 30 turns (n=30) were made until the widthwise edge portion of the mixture-formed portion 9 was returned to a position substantially the same as the initial position. Specifically, the detection unit 11 was provided in close proximity to the coiler unit 8, and the boundary between the mixture-formed portion 9 and the core material 2 was detected by the detection unit 11. Then, while the overall meandering motion of the paste-coated sheet 6 was corrected, the paste-coated sheet 6 was wound while the base 10 was reciprocally moved using the driving unit 13 based on signals from the control unit 12 such that the following operation was repeated: winding the paste-coated sheet 6 fifteen turns while moving it 2 mm to the left for each turn; and thereafter winding the paste-coated sheet 6 fifteen turns.

A five meter length of the wound paste-coated sheet 6 was unwound, and the deformation of the paste-coated sheet 6 at a 195 m point after application was observed in terms of the deflection height. It was found that the maximum value of the deflection was only 0.06 mm at the widthwise edge of the mixture-formed portion 9.

Example 3

In contrast to Example 1, the paste-coated sheet 6 was wound on the coiler unit 8 such that 8 turns (n=8) were made until the widthwise edge portion of the mixture-formed portion 9 was returned to a position substantially the same as the initial position. Specifically, the detection unit 11 was provided in close proximity to the coiler unit 8, and the boundary between the mixture-formed portion 9 and the core material 2 was detected by the detection unit 11. Then, while the overall meandering motion of the paste-coated sheet 6 was corrected, the paste-coated sheet 6 was wound while the base 10 was reciprocally moved using the driving unit 13 based on signals from the control unit 12 such that the following operation was repeated: winding the paste-coated sheet 6 four turns while moving it 2 mm to the left for each turn; and thereafter winding the paste-coated sheet 6 four turns.

A five meter length of the wound paste-coated sheet 6 was unwound, and the deformation of the paste-coated sheet 6 at a 195 m point after application was observed in terms of the deflection height. It was found that the maximum value of the deflection was only 0.04 mm at the widthwise edge of the mixture-formed portion 9. However, it was visually observed that wrinkles were formed in several portions of the paste-coated sheet 6.

Example 4

In contrast to Example 1, the paste-coated sheet 6 was wound on the coiler unit 8 such that 34 turns (n=34) were made until the widthwise edge portion of the mixture-formed portion 9 was returned to a position substantially the same as the initial position. Specifically, the detection unit 11 was provided in close proximity to the coiler unit 8, and the boundary between the mixture-formed portion 9 and the core material 2 was detected by the detection unit 11. Then, while the overall meandering motion of the paste-coated sheet 6 was corrected, the paste-coated sheet 6 was wound while the base 10 was reciprocally moved using the driving unit 13 based on signals from the control unit 12 such that the following operation was repeated: winding the paste-coated sheet 6 seventeen turns while moving it 2 mm to the left for each turn; and thereafter winding the paste-coated sheet 6 seventeen turns.

A five meter length of the wound paste-coated sheet 6 was unwound, and the deformation of the paste-coated sheet 6 at a 195 m point after application was observed in terms of the deflection height. It was found that the maximum value of the deflection was only 0.07 mm at the widthwise edge of the mixture-formed portion 9. However, it was visually observed that the edge portion of the paste-coated sheet 6 leaned to one side and was stretched in a wavy form.

Example 5

In consideration of the results of Examples 1 to 4, the paste-coated sheet 6 was wound on the coiler unit 8 such that 20 turns (n=20) were made until the widthwise edge portion of the mixture-formed portion 9 was returned to a position substantially the same as the initial position, in contrast to Example 1. Specifically, the detection unit 11 was provided in close proximity to the coiler unit 8, and the boundary between the mixture-formed portion 9 and the core material 2 was detected by the detection unit 11. Then, while the overall meandering motion of the paste-coated sheet 6 was corrected, the paste-coated sheet 6 was wound while the base 10 was reciprocally moved using the driving unit 13 based on signals from the control unit 12 such that the following operation was repeated: winding the paste-coated sheet 6 ten turns while moving it 2 mm to the left for each turn; and thereafter winding the paste-coated sheet 6 ten turns.

A five meter length of the wound paste-coated sheet 6 was unwound, and the deformation of the paste-coated sheet 6 at a 195 m point after application was observed in terms of the deflection height. It was found that the maximum value of the deflection value was very small, only 0.02 mm, at the widthwise edge of the mixture-formed portion 9.

Comparative Example

Figure 4:
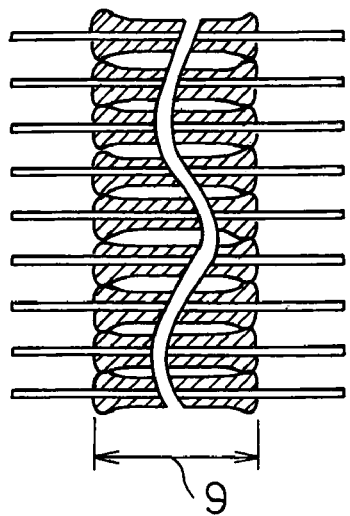
FIG. 4 is a schematic view of an enlarged partial cross-section of a paste-coated sheet wound in a coil shape using a conventional electrode mixture paste application apparatus.

The same procedure as in Example 1 was repeated to produce a paste-coated sheet 6, except that, when the paste-coated sheet 6 was wound on the coiler unit 8, only the correction of the overall meandering motion of the paste-coated sheet 6 was performed to form a shape shown in FIG. 4.

A five meter length of the wound paste-coated sheet 6 was unwound, and the deformation of the paste-coated sheet 6 at a 195 m point after application was observed in terms of the deflection height. It was found that the maximum value of the deflection was 0.8 mm at the widthwise edge of the mixture-formed portion 9.

As can be understood from the above results, when the paste-coated sheet 6 is wound on the coiler unit 8, it is desirable to set to $10 \leq n \leq 30$ the number of turns until the widthwise edge of the mixture-formed portion 9 of the paste-coated sheet 6 returns to a position substantially the same as the initial position. In this case, the effect is highest when n=20.

It is needless to say that the configuration of the coiler unit 8 of the present invention provides similar effects when this configuration is applied not only to an apparatus for applying an electrode mixture paste but also to continuous roller rolling using rolling rollers.

INDUSTRIAL APPLICABILITY

As has been described, according to the present invention, a suitable wound shape of a paste-coated sheet is obtained, and therefore the reduction of yield caused by the deformation of electrodes can be avoided. Therefore, the invention is highly useful and can be widely used as a technique capable of manufacturing electrodes for various batteries including nickel metal-hydride storage batteries with high productivity.

The invention claimed is:

1. An electrode mixture paste application method for applying an electrode mixture paste on a core material made of porous metal thin plate while traveling the core material, the method comprising:
    a first step of unwinding the core material wound in a coil shape;
    a second step of applying the electrode mixture paste to both sides of the core material;
    a third step of adjusting an application amount of the electrode mixture paste;
    a fourth step of drying a paste-coated sheet with the electrode mixture paste applied to the both sides thereof;
    a fifth step of detecting a boundary between a mixture-formed portion and the core material; and
    a sixth step of winding the paste-coated sheet in a coil shape,
    wherein, in the sixth step, the paste-coated sheet is wound based on a detection result of the fifth step such that each of widthwise edge portions of the mixture-formed portion is prevented from sequentially overlapping itself.

2. The electrode mixture paste application method according to claim 1, wherein, in the sixth step, the paste-coated sheet is wound while the paste-coated sheet is moved in right and left directions with substantially the same phase difference, and $10 \leqq n \leqq 30$ is satisfied where n is the number of turns until the mixture-formed portion returns to substantially the same position in a width direction thereof.

3. The electrode mixture paste application method according to claim 2, wherein the number of turns n until the mixture-formed portion returns to substantially the same position in the width direction thereof is 20.

4. An electrode mixture paste application apparatus for applying an electrode mixture paste on a core material made of porous metal thin plate while traveling the core material, the apparatus comprising:
    an uncoiler unit for unwinding a core material wound in a coil shape;
    an immersion unit for immersing the core material in the electrode mixture paste;
    an application amount adjusting unit for adjusting an application amount of the electrode mixture paste;
    a drying unit;
    a detection unit for detecting a boundary between a mixture-formed portion and the core material; and
    a coiler unit for winding a paste-coated sheet, after applying and drying, in a coil shape,
    wherein the coiler unit includes a mechanism for winding the paste-coated sheet based on a detection result of the detection unit such that each of widthwise edge portions of the mixture-formed portion is prevented from sequentially overlapping itself.

* * * * *